United States Patent Office 2,902,521
Patented Sept. 1, 1959

2,902,521

PROCESS FOR THE PRODUCTION OF FLUOROCARBONS

Charles S. Cleaver and Mark W. Farlow, Wilmington, Del., assignors to E. I. du Pont de Nemours and Company, Wilmington, Del., a corporation of Delaware No Drawing. Application September 17, 1957
Serial No. 684,400

7 Claims. (Cl. 260—653.3)

This invention relates to an improved method of synthesizing fluorocarbons, particularly tetrafluoroethylene.

The technical importance of fluorocarbons is constantly increasing. Tetrafluoroethylene in particular is of such high industrial interest that new and improved methods of synthesizing it are actively being sought. A recent technical advance in this field has been the discovery that fluorocarbons can be prepared by reacting certain organic or inorganic fluorides with carbon at high temperature. When the reaction temperature is high enough (generally above 1500° C.) and the gaseous reaction product is rapidly cooled, preferably to below 500° C., immediately following contact with the hot carbon, tetrafluoroethylene is found to be present in very substantial amounts in the fluorocarbon product. These developments have been published in a series of United States patents, principally 2,709,182; 2,709,186 to 2,709,192, inclusive; 2,725,410; 2,732,410 and 2,732,411.

These high temperature processes constitute a major improvement in the field of fluorocarbon synthesis. However, they present the technical difficulty that devices for producing temperatures above about 1500° C., such as electric arcs and induction-heated or resistance-heated furnaces, are mechanically complex and generally thermally inefficient. These features, of course, add to the cost of producing the fluorocarbon.

We have now found that the process of reacting active fluorides with carbon to produce fluorocarbons, and specifically tetrafluoroethylene, can be substantially improved by generating in situ by a chemical process at least part of the heat necessary to sustain the reaction. The heat is therefore in a more efficient form. This improvement makes it possible to compensate for the thermal losses associated with any particular reactor, and to maintain more precisely the optimum reaction temperature for any given system.

Our invention resides, in the known process of synthesizing tetrafluoroethylene by reacting fluorides with carbon at high temperature and rapidly quenching the gaseous reaction product, in the step which comprises adding oxygen to the reaction mixture, the oxygen-yielding reactant(s) being used in amounts such as to provide at least 0.2 mole of oxygen per mole of the fluoride reactant, and at least sufficient carbon being present to combine with all the added oxygen and to form tetrafluoroethylene, whereby at least a substantial part of the heat necessary for the synthesis is supplied by the exothermic oxidation of carbon.

Inasmuch as tetrafluoroethylene is known to be very sensitive to and destroyed by oxidizing agents, particularly oxygen, it was totally unexpected to find that it is possible to use oxygen as an aid in the synthesis of tetrafluoroethylene at the very high temperatures which are required, and that tetrafluoroethylene is capable of surviving under such conditions. In U.S. Patent 2,351,390, tetrafluoroethylene is reported to react vigorously with oxygen, as a flame, and to be thus completely converted to carbon tetrafluoride; whereas in one specific embodiment of the process of our invention the reverse result is accomplished, that is, conversion of carbon tetrafluoride to tetrafluoroethylene.

While it has been recognized previously that, in the process where elemental fluorine is brought in contact with carbon at high temperature to produce tetrafluoroethylene as described in U.S. Patent 2,732,411, part of the necessary heat is furnished by the exothermic reaction of elemental fluorine with carbon, any internal heat that may be produced in this unusual instance is limited strictly by the stoichiometry of the reaction. It is not controllable either in amount or mode of application; hence, the reaction is not a practical or economical method of generating heat for the tetrafluoroethylene synthesis.

The fluorides which serve as starting materials in the process of the present invention are those known in the art to give tetrafluoroethylene on contact with hot carbon followed by rapid quenching, and disclosed as suitable for that purpose in the various U.S. patents listed above. These fluorides include elemental fluorine; the halogen fluorides; the fluorides of the following elements, referring to the periodic table published in Deming's "General Chemistry" (5th edition, Wiley, 1944): the group II–B elements; the B-family elements in groups IV to VI having atomic numbers from 22 to 74, inclusive; the elements of atomic numbers 26 to 29, inclusive; the elements of Group V–A; the elements of Group VI–A having atomic numbers from 16 to 52, inclusive; the silicon fluorides; the inorganic ternary oxyfluorides; the fluorocarbons, principally carbon tetrafluoride and hexafluoroethane; carbonyl fluoride and carbonyl thiofluoride. For the purpose of this invention, we refer to the above fluorides in a generic sense as "active fluorides."

Of the active fluorides, the preferred ones, for reasons of practicality of use, are those which are readily volatile, i.e., those which are gases or liquids boiling below 125° C. at atmospheric pressure. Moreover, for reasons of accessibility and good results, the preferred fluorides are those which contain at least one non-halogen element (since fluorine itself and the halogen fluorides are difficult and hazardous to handle) and which are hydrogen-free, because of the possibility of formation of water, it being understood that water formation is detrimental to the tetrafluoroethylene synthesis. The most useful and preferred fluorides are the fluorocarbons, especially carbon tetrafluoride and hexafluoroethane, silicon tetrafluoride, phosphorus pentafluoride, sulfur tetrafluoride, sulfur hexafluoride and arsenic trifluoride.

The oxygen-yielding reactants suitable for use in the process of this invention include, besides oxygen itself, its mixtures with essentially inert gases, for example air or oxygen-enriched air; compounds which decompose exothermally to provide oxygen, e.g., ozone, the fluorine oxides such as $OF_2$ or $O_2F_2$, or the nitrogen oxides such as $N_2O$, $NO$ and $NO_2$. Oxygen itself is the preferred oxidizing agent, since its adiabatic reaction with carbon is known to be capable of producing temperatures as high as 3210° C.

Any form of carbon is suitable for the purpose of this invention, for example, coal, graphite, charcoal or the various forms of carbon black such as lamp black, acetylene black, or bone black.

In order to realize the benefits of this improvement, that is, in order that a substantial part of the necessary heat input be supplied by the oxidation of carbon, it is essential to use sufficient oxygen-yielding reactants to provide at least 0.2 mole of oxygen per mole of fluoride reactant. Preferably, this ratio is at least 1:1, and it can be considerably higher, e.g., 5:1 or higher, if it is desired that all or most of the heat be supplied by the carbon-oxygen reaction. The amount of oxygen necessary for a self-supporting reaction can be estimated from thermodynamic data. For example, it can be calculated that using oxygen and carbon tetrafluoride (a preferred fluoride reactant) in a mole ratio of about 3.5:1, over excess carbon, an adiabatic temperature of 2000° C. can be maintained in the reaction system.

It is also essential that the carbon be present in amount at least sufficient to combine with all the oxygen, as carbon monoxide, and with all the fluorine, as tetrafluoroethylene. Normally, the carbon is used in excess of these combined theoretical amounts, and the excess can be quite large, if desired. By "carbon" is meant here the elemental carbon, independent of the carbon which may be present in combined form in the starting fluoride when the latter is an organic fluoride such as, for example, carbon tetrafluoride.

The reaction conditions are essentially those described in the patents already referred to for the synthesis of tetrafluoroethylene. Thus, the reaction temperature should be above about 1500° C., and it can be as high as can be obtained by practical means, for example, in the temperature range of the carbon arc, which is estimated to be 2500–4000° C. The optimum temperature depends in part, of course, on the reactivity of the fluoride employed.

The absolute pressure of the reaction gases during the pyrolysis is not critical. In general, however, it is much preferred to operate at reduced pressures, which can be as low as 1 mm. of mercury but are desirably in the range of 10–300 mm. of mercury. This is especially desirable when an electric arc is used as the source of heat, since the operation of the arc becomes more difficult with increase in pressure. With other types of reactors, e.g., externally heated tubular reactors packed with carbon, the absolute pressure is much preferably subatmospheric, but it can be atmospheric or even superatmospheric.

Practical conversions to tetrafluoroethylene can be obtained only if the product from the hot reaction zone is cooled very rapidly (quenched) to a temperature not exceeding 500° C., preferably of the order of 400° C. or lower. The time during which the gaseous reaction product is cooled, that is, the time of transition from the reaction temperature to about 400–500° C. should not exceed one second. Preferably, it is in the range of 0.001 to 0.1 second. The optimum rate of flow through the hot reaction zone of the gaseous reactants (the term "gaseous" as used herein includes not only true gases but also vaporized materials and suspended, finely divided solids) depends in large part on this quenching requirement, that is, on the efficiency of the quenching system. Reduced pressures facilitate rapid quenching in any given form of apparatus.

The necessary quenching can be achieved by forcing the off-gas from the reaction zone immediately into cold portions of the apparatus, e.g., cold metal or glass surfaces. In another modification, the off-gas is carried immediately from the hot zone into a suitably designed quench reactor where it comes in intimate contact with a finely divided (fluidized) solid, which is advantageously carbon.

Apparatus of any suitable design can be used to carry out the process of this invention. If all the heat is to be supplied chemically, i.e., by oxidation of carbon, the pyrolysis can be conducted in the form of an enclosed flame, or as a blast furnace type of operation, in which the gaseous or vaporized fluoride and the oxygen are passed, mixed or separately, through a bed of hot carbon.

If only part of the heat is to be supplied chemically, there can be used any of the devices for heating carbon previously used in the synthesis of fluorocarbons and described in issued U.S. patents, for example U.S. 2,709,192. Thus, there can be used a tube packed with carbon or graphite and heated in a resistance furnace or induction furnace. The tube is initially heated to reaction temperature, after which the flow of fluoride and oxygen through the hot carbon is begun and the external supply of heat can be reduced in proporation to the heat derived from the oxidation. In a variation of this procedure, the flow of oxygen is begun before the desired temperature has been reached, in order to increase the temperature of the reaction zone while the external heat input is kept at the same level.

Another suitable device is the carbon arc, which produces extremely high temperatures. In this type of equipment, part at least of the reactant carbon is provided by the electrodes, although additional carbon can be introduced, if desired, together with the fluoride and oxygen-supplying gas. Improved forms of carbon arc, well adapted to the synthesis of fluorocarbons, are described in U.S. 2,709,192 and other patents, and these are entirely suitable for use in the present process, with such appropriate modifications as may be required for the introduction of the oxygen-supplying gas.

An especially suitable type of electric arc for use in this process is a magnetically rotated arc. In comparison with static arcs of conventional design or even with the improved arcs of the kind mentioned above, a rotating arc is far more efficient by virtue of its much greater stability and of the far better contact between arc and reactants that it permits. Some of the examples which follow were carried out using an arc of this type.

A particularly efficient type of rotating carbon arc is fully described and claimed in the copending application of Burk, Serial No. 515,705, filed June 15, 1955, now abandoned. It operates as follows: The reactants (in the present invention, the oxygen-yielding gas and the fluoride, and if desired additional carbon) pass through a symmetrical annular gap formed by a substantially cylindrical solid graphite cathode and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A suitable field strength to cause rotation is 100–200 gauss. The arc rotates extremely rapidly in the annular gap between the electrodes, its speed being estimated at 1000 to 10,000 revolutions per second, and it heats the reactants very uniformly to extremely high temperatures as they pass through the gap. The gaseous reaction product leaves the arc chamber through the hollow anode and is immediately cooled by contact with cold portions of the apparatus or with a finely divided solid in a quenching chamber.

The electrical characteristics of the rotating arc are essentially similar to those of a linear arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated, taking into account the heat supplied by the reaction of the oxygen added with the carbon present in the system.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Suitable provisions can be made to maintain the electrodes in the same relative position, that is, to compensate for the loss of carbon from the electrodes through fluorination and oxidation.

Regardless of what type of reactor is employed, this process is normally operated so that the two concurrent reactions; that is to say, fluorination of carbon and oxidation of cargon occur simultaneously in the same zone. However, it is also possible to operate in consecutive cycles by bringing the oxygen and the fluoride in contact with the carbon either wholly alternatively or as mixtures in which the ratio of the two components is changed as desired.

As in the already described synthesis of tetrafluoroethylene without oxidizing agent, the reaction in our improved process normally gives a mixture of fluorocarbons, the preponderant constituents of which are carbon tetrafluoride and tetrafluoroethylene, with in general lesser amounts of hexafluoroethane, and sometimes still lesser amounts of other saturated or unsaturated fluorocarbons. The crude reaction product may also contain some unreacted fluoride, which can be recycled, and the free element whose fluoride was employed, or compounds thereof. Carbon monoxide is present in the gaseous reaction product, furnishing evidence of the liberation of corresponding quantities of chemical heat in the reaction chamber.

The fluorocarbons can be isolated by passing the gaseous reaction mixture through cold condensers and fractionating the condensate through efficient distilling columns. In this way, tetrafluoroethylene can be readily separated from carbon tetrafluoride. Its separation from hexafluoroethane requires more efficient fractionation, or it can be carried out by selective solvent extraction or by selective adsorption on solids. However, in most cases it is not at all essential for the tetrafluoroethylene to be completely freed of hexafluoroethane.

The fluorocarbons other than tetrafluoroethylene which are produced in the process can be used as such (carbon tetrafluoride, for example, is a useful chemical) or they can be in turn converted to tetrafluoroethylene by reaction with hot carbon in accordance with the published methods or with the process of this invention.

The following examples illustrate the invention in greater detail. In all examples in which a carbon arc was used, this was a magnetically rotated arc of the type described above. In some of the examples, quenching of the reaction product to temperatures below 400° C. was accomplished by drawing the gas stream from the reaction zone into a quench reactor (jet quencher) in which the hot gases came into intimate contact with fine carbon particles maintained in agitated suspension (fluidized) by the gas stream itself. The process of contacting the off-gas from a fluorocarbon synthesis with carbon to quench it and increase the yield of tetrafluoroethylene is fully described and claimed in the copending U.S. application of Denison, Edlin and Whipple, Serial No. 515,738, filed June 15, 1955, now U.S. Patent No. 2,852,574. In other examples, the gas was quenched by contact with cold walls. The gases after cooling were led to cold traps where the condensable portions were collected.

*Example I*

A 1:2 (by volume) mixture of carbon tetrafluoride and nitric oxide was passed through a rotating carbon arc at the rate of about 0.2 g./minute of carbon tetrafluoride. The pressure inside the arc was 27 mm. of mercury, and the arc was operated at 24 volts and 30 amperes. The off-gas was cooled in a graphite jet quencher immediately upon leaving the arc chamber, and collected in a trap cooled with liquid nitrogen. This product was shown by infrared analysis to contain, on a molar basis, 50% of tetrafluoroethylene, 30% of carbon tetrafluoride, 15% of hexafluoroethane and small amounts of other ingredients. There was also formed large quantities of a non-condensable gas which was essentially a mixture of nitrogen and carbon monoxide, indicating that oxidation of carbon had taken place.

*Example II*

A 1:1 (by volume) mixture of carbon tetrafluoride and oxygen was passed through a rotating carbon arc at the rate of about 0.3 g./minute of carbon tetrafluoride. The pressure inside the arc chamber was 20 mm., and the arc was operated at 25 volts and 30 amperes. The gaseous product was quenched and collected as in Example I. The condensed gas contained, on a molar basis, 55% of tetrafluoroethylene, 25% of carbon tetrafluoride and 10% of hexafluoroethane. The non-condensable gas consisted essentially of carbon monoxide.

*Example III*

A mixture of carbon tetrafluoride and oxygen in the volume ratio of approximately 4:1 was passed at a pressure of 30–35 mm. through a rotating carbon arc, and the off-gas was immediately quenched by passage through a water-cooled copper tube. The product condensed in traps cooled in liquid nitrogen was shown by mass spectrometer analysis to contain, on a molar basis, 31% of tetrafluoroethylene, 54% of carbon tetrafluoride and 10% of hexafluoroethane. There was also obtained carbon monoxide as a non-condensable gas. Further evidence of reaction between the oxygen and the carbon of the arc was given by visual observation of the arc through a dark glass, which showed that the arc was significantly hotter in a carbon tetrafluoride-oxygen stream than in a stream of carbon tetrafluoride alone.

*Example IV*

A mixture of carbon tetrafluoride (approximately 0.5 mole/hour) and oxygen (approximately 0.35 mole/hour) was passed through a bed of granular graphite placed in a graphite induction-heated tube furnace essentially similar to that described in U.S. Patent 2,709,192. The temperature of the graphite bed was 2500° C., and the exit pressure of the gas stream was 25 mm. The off-gas was quenched in a water-cooled copper tube and led to traps cooled in liquid nitrogen. The condensable portion contained, on a molar basis, 35% of tetrafluoroethylene, 48% of carbon tetrafluoride and 11% of hexafluoroethane.

External heating was then discontinued, but production of tetrafluoroethylene continued at a high level for several minutes. The condensable product formed in the absence of external heat was found to contain, on a molar basis, 35% of tetrafluoroethylene, 50% of carbon tetrafluoride and 9% of hexafluoroethane. The non-condensable gas from these operations was essentially carbon monoxide. This was evidence that a substantial portion of the required heat input was supplied by oxidation of the carbon.

*Example V*

A mixture of phosphorus pentafluoride and oxygen (approximately 0.4 mole/hour of each) was passed through a rotating carbon arc operated at 30 volts and 40 amperes. The exit pressure of the gas was 20 mm. The off-gas was quenched and collected as in Example III. The condensable product contained, on a molar basis, 25% of tetrafluoroethylene, 11% of carbon tetrafluoride and 55% of phosphorus trifluoride, the latter being formed in the reaction of phosphorus pentafluoride with carbon. The non-condensable gas was found by mass spectrometric analysis to contain over 97% of carbon monoxide and no oxygen.

*Example VI*

A mixture of sulfur tetrafluoride and oxygen (approximately 0.4 mole/hour of each) was reacted with carbon in a rotating carbon arc and the off-gas was quenched and collected as in Example III. The condensable product contained fluorocarbons, principally tetrafluoroethylene, carbon tetrafluoride and hexafluoroethane, and in addition carbon disulfide and other sulfur compounds. The non-condensable contained over 96% of carbon monoxide.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process for the preparation of fluorocarbons by reacting fluorides, which are known to give tetrafluoroethylene on contact with hot carbon followed by rapid quenching, with carbon at high temperature and rapidly quenching the gaseous reaction products, the step which comprises adding an oxygen yielding reactant selected from the group consisting of elemental oxygen and nitrogen oxides to the reaction mixture in an amount sufficient to provide at least 0.2 mole of oxygen per mole of the fluoride reactant and at least sufficient carbon being present to combine with all the added oxygen and with all the fluorine present.

2. In a process for the preparation of tetrafluoroethylene by heating an active fluoride having a boiling point below 125° C. at atmospheric pressure with carbon to a temperature of at least 1500° C., rapidly cooling the reaction products to below about 500° C. and isolating the resultant tetrafluoroethylene therefrom, the step which comprises adding an oxygen yielding reactant selected from the group consisting of elemental oxygen and nitrogen oxides to the reaction mixture in an amount sufficient to provide at least 0.2 mole of oxygen per mole of the fluoride reactant and at least sufficient carbon being present to combine with all the added oxygen and to form tetrafluoroethylene, whereby at least a substantial part of the heat necessary for the tetrafluoroethylene preparation is supplied by the exothermic oxidation of carbon.

3. In a process for the preparation of tetrafluoroethylene by pyrolyzing an active fluoride having a boiling point below 125° C. at atmospheric pressure in a carbon arc, rapidly quenching the reaction products and isolating the tetrafluoroethylene formed, the step which comprises adding oxygen to the reaction mixture in an amount sufficient to provide at least 0.2 mole of oxygen per mole of fluoride reactant, carbon being present in the reaction system in an amount at least sufficient to combine with all the oxygen, as carbon monoxide, and with all the fluorine, as tetrafluoroethylene.

4. Process for synthesizing fluorocarbons which comprises heating carbon with an active fluoride having a boiling point below 125° C. at atmospheric pressure in the presence of oxygen, the mole ratio of oxygen to fluoride being at least 0.2 to 1.0 in the reaction mixture initially, carbon being present in amount in said mixture at least sufficient to combine with all of the oxygen as carbon monoxide and with all the fluorine as tetrafluoroethylene, continuing said heating at a temperature of at least 1500° C. until fluorocarbons are produced, cooling said fluorocarbons rapidly to a temperature not higher than 500° C., and isolating tetrafluoroethylene therefrom.

5. The process of claim 3 wherein the active fluoride is carbon tetrafluoride, the mole ratio of oxygen with respect to the fluoride being at least 1:1, said tetrafluoride being passed with oxygen through a rotating carbon arc.

6. The process of claim 3 wherein the active fluoride is phosphorus pentafluoride, the mole ratio of oxygen with respect to said pentafluoride being at least 1:1, and the mixture of oxygen and said pentafluoride being passed through a rotating carbon arc.

7. The process of claim 3 wherein the active fluoride is sulfur tetrafluoride, the mole ratio of oxygen with respect to the fluoride being at least 1:1, said tetrafluoride being passed with oxygen through a rotating carbon arc.

References Cited in the file of this patent

UNITED STATES PATENTS

| | | |
|---|---|---|
| 2,351,390 | Benning et al. | June 13, 1944 |
| 2,694,624 | Sweetser | Nov. 16, 1954 |
| 2,709,186 | Farlow et al. | May 24, 1955 |
| 2,709,189 | Farlow et al. | May 24, 1955 |
| 2,722,559 | Farlow et al. | Nov. 1, 1955 |
| 2,725,410 | Farlow et al. | Nov. 29, 1955 |